(12) United States Patent
Vicentelli

(10) Patent No.: US 7,276,270 B2
(45) Date of Patent: Oct. 2, 2007

(54) ELEMENT FOR JOINING MODULES WITH MAGNETIC ANCHORAGE FOR THE CONSTRUCTION OF STABLE GRID STRUCTURES

(76) Inventor: Claudio Vicentelli, Via Soldini 14/A, Chiasso (CH) CH6830

( * ) Notice: Subject to any disclaimer, the term of this patent is extended or adjusted under 35 U.S.C. 154(b) by 0 days.

(21) Appl. No.: 10/416,968

(22) PCT Filed: Mar. 18, 2002

(86) PCT No.: PCT/EP02/02959

§ 371 (c)(1),
(2), (4) Date: May 16, 2003

(87) PCT Pub. No.: WO02/076565

PCT Pub. Date: Oct. 3, 2002

(65) Prior Publication Data

US 2004/0043164 A1    Mar. 4, 2004

(30) Foreign Application Priority Data

Mar. 22, 2001  (IT) ............... MI2001A0608

(51) Int. Cl.
*B29D 22/00* (2006.01)
*B29D 23/00* (2006.01)
*B32B 1/08* (2006.01)

(52) U.S. Cl. .......... 428/36.9; 428/36.92; 446/92; 248/309.4; 434/277; 434/278; 52/36.5; 52/36.6

(58) Field of Classification Search ............ 403/52, 403/66, 111, 119, 164, 169, 170, 178; 52/27, 52/36.5; 428/34.1, 35, 7, 36.9, 36.92; 446/92, 446/85, 124; 248/206.5, 309.4; 434/190, 434/277, 278

See application file for complete search history.

(56) References Cited

U.S. PATENT DOCUMENTS 2,970,388 A * 2/1961 Yonkers ............. 434/277
3,998,004 A * 12/1976 Ehrlich .............. 446/92
4,030,209 A * 6/1977 Dreiding ............ 434/278

FOREIGN PATENT DOCUMENTS

| DE | 297 18 665 |   | 9/1998 |
| FR | 2153792 | * | 4/1973 |
| GB | 1 359 625 |   | 7/1974 |
| WO | WO90/10126 |   | 9/1990 |
| WO | WO99/60583 |   | 11/1999 |

* cited by examiner

*Primary Examiner*—Michael C. Miggins
(74) *Attorney, Agent, or Firm*—Young & Thompson

(57) ABSTRACT

In an assembly of modules with magnetic anchorage for the construction of a grid structure, a joining element for connecting rigidly at least a first and a second elongated modules of the grid structure, characterised in that it comprises: a body of the joining element; at least a first and a second tubular projections of the body for axial attachment of the first and respectively second elongated modules; and a housing of the body for securing the body to a further module of the grid structure; the at least first and second tubular projections being in direct communication with the housing for contact of the further module to the at least first and second elongated modules.

75 Claims, 3 Drawing Sheets

ELEMENT FOR JOINING MODULES WITH MAGNETIC ANCHORAGE FOR THE CONSTRUCTION OF STABLE GRID STRUCTURES

The present invention relates to a joining element to be used in an assembly of modules with magnetic anchorage for the construction of stable grid structures which are used in the sector of games or also in the area of display or furnishing.

From Italian patent no. 01301090 whereof the same Applicant is owner, an assembly of modules is known which optimises the exploitation of the magnetic energy available for anchorage between the modules in such a way as to achieve a plurality of grid structures having the most inventive and complex shapes.

The point of magnetic coupling between two modules can be chosen as required at any one of the zones of the magnetically active and/or ferromagnetic surface of one of the modules and is not restrained by a predefined orientation between the two modules, in such a way that the modules of the assembly can be combined overall one with the other, obtaining a plurality of shapes.

In all systems of magnetic anchorage assembly known today, and above all in those magnetic anchorage assemblies which under-use the magnetic energy available for anchorage between modules, it is seen how some shapes of the grid structure do not have the appropriate requirements of stability and capacity for self-support, particularly as regards resistance to shearing or slipping and to bending.

In these cases the shape of the original grid structure has to be modified by adding thereto—ad hoc—other modules for ensuring its stability.

This solution, in addition to modifying the original shape of the grid structure required, may cause an excessive increase in the weight and cost of the grid structure itself.

In order to avoid this disadvantage, the patent application no. MI2001U000010 whereof the same Applicant is owner provides elements for stabilisation of the grid structure in the form of panels which can be removably slotted in corresponding polygonal areas defined by the modules of the grid structure.

The main object of the present invention is that of providing an assembly of modules with magnetic anchorage for the construction of grid structures which achieve, using the same number of magnetic modules, improved resistance to deformation due to stresses of shearing, slipping, torsion or bending.

Another object of the present invention is that of providing an assembly of modules with magnetic anchorage for the construction of grid structures with the required shape which have been made stable without the shape having been modified and without the overall cost and weight having been increased excessively.

These objects are achieved, in an assembly of modules with magnetic anchorage for the construction of a grid structure, by a joining element for connecting rigidly at least a first and a second elongated modules of the grid structure, characterised in that it comprises: a body of the joining element; at least a first and a second tubular projections of said body for axial attachment of said first and respectively second elongated modules; and a housing of said body for securing said body to a further module of said grid structure; said at least first and second tubular projections being in direct communication with said housing for contact of said further module to said at least first and second elongated modules.

With such a joining element two or more elongated modules are attached in predefined angular directions but do not come into direct contact one with the other, being connected via an additional module of the grid structure.

In such a joining element it is possible to unite the side walls of adjacent tubular projections with a flat ribbing which can also be used as a support bracket for the corners of shelves or panels which the grid structure may have to hold.

Also disclosed is a joining element which places in direct contact the elongated modules of the grid structure.

Such a joining element can integrate an axial spacer.

The axial spacer can be a ferromagnetic element or, in turn, a magnetic module in such a way as not to introduce dispersions in the magnetic flow circulating via the modules connected by the joining element.

The joining element of the present invention enables fixing of the corner and if necessary the axial space between the modules to be connected, and can also act as template for the accurate angular arrangement of the modules during assembly of the grid structure.

The joining element of the present invention can be made in a lightweight and economical material and enables extremely stable grid structures to be obtained without jeopardising the original simplicity and flexibility of assembly.

These aspects will be made clearer from the following reading of some preferred embodiments of the invention, to be read by way of a non-limiting example of the more general concept claimed.

The following description refers to the accompanying drawings, in which.

Figure 1:
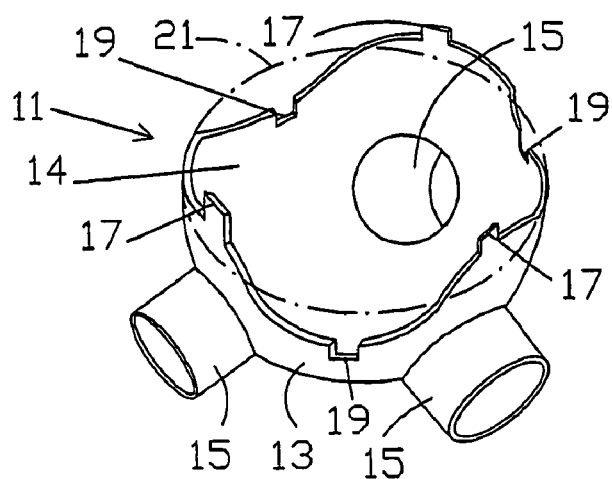
FIG. 1 is a perspective view of a preferred embodiment of the joining element for a grid structure of spherical and cylindrical modules with magnetic anchorage.
Figure 2:
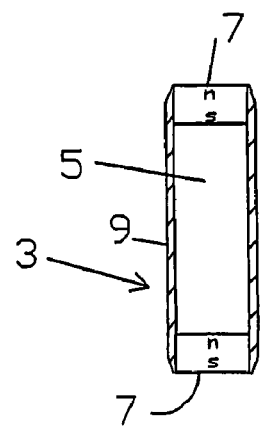
FIG. 2 is a side elevation view, partially sectioned axially, of a cylindrical module of the grid structure which can be connected to the joining element of FIG. 1.
Figure 3:
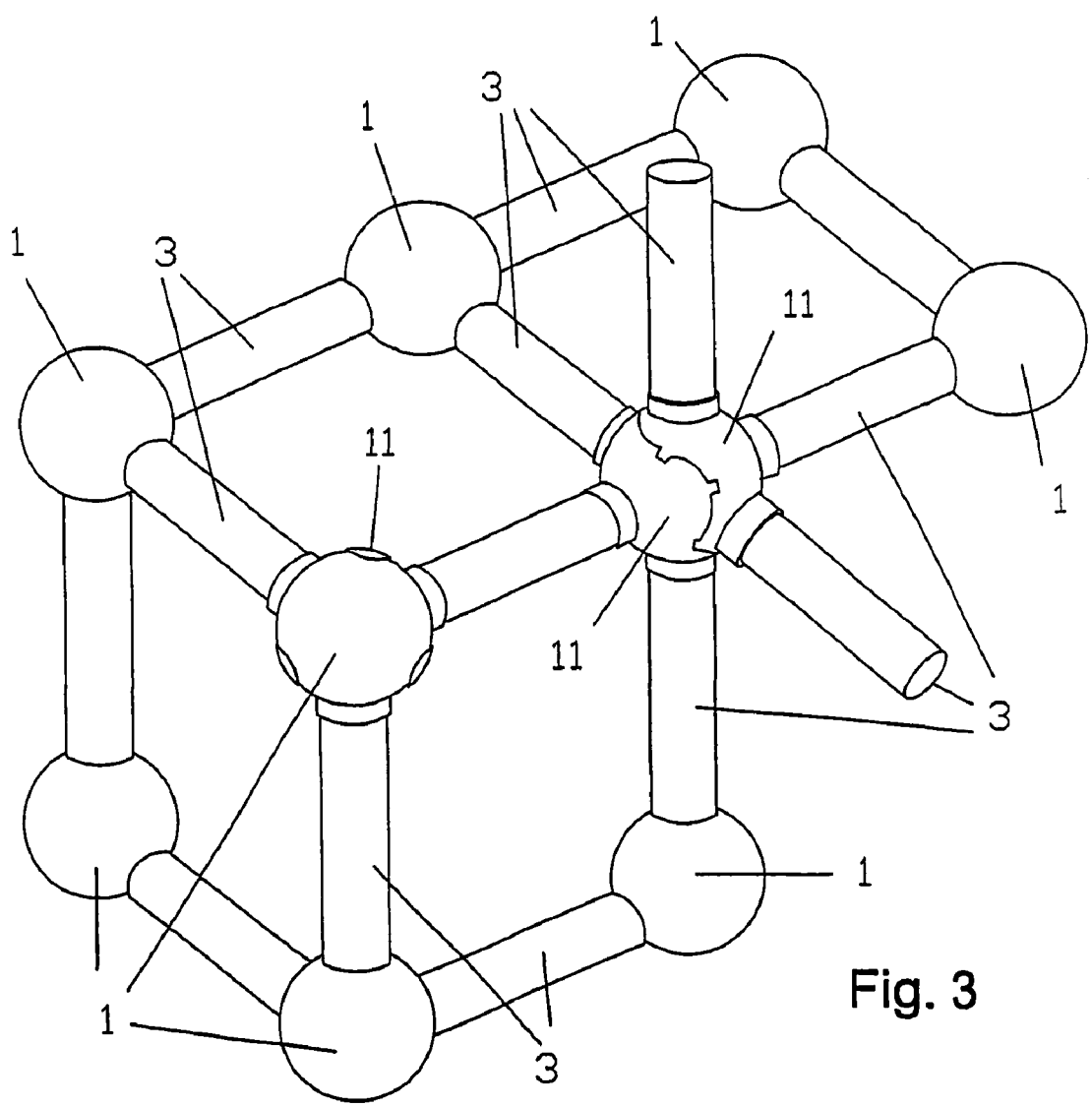
FIG. 3 is a perspective view of a portion of grid structure which uses the joining element of FIG. 1 and cylindrical modules of FIG. 2.

With reference to FIGS. 1-3, the grid structure is formed by cylindrical modules 3 with bevelled edges and by spherical modules 1 placed at nodes of the grid structure.

Naturally FIG. 3 only illustrates a portion of a grid structure which in actual fact can reach the required three-dimensional shape and extension.

The spherical modules 1 are in a ferromagnetic material, for example in mild steel covered with an antioxidant material.

The cylindrical modules 3 are instead composed of: a cylindrical ferromagnetic pin 5; a pair of cylindrical magnetic elements 7 magnetised axially and attached with opposite magnetic polarity (in FIG. 2 n denotes the north polarity and s the south polarity of the magnetic elements 7) at the end bases of the pin 5 coaxially to the pin 5; and a non-magnetic tubular matrix 9 which covers the lateral surface of the pin 5 and magnetic elements 7 and which has the base ends bevelled.

The joining element 11 comprises a body shaped like a semispherical cap or shell 13.

The body of the joining element 11 forms a housing 14 defined by the internal surface of the body of the joining element 11 and having radius equal to that of the spherical module 1 of the grid structure to be secured into said housing 14.

The body of the joining element 11 further has three tubular projections 15, orthogonal one in relation to the other, which extend radially from the semi-spherical cap 13 towards the outside thereof and which have the internal hollow section with radius equal to that of the cylindrical modules 3.

The tubular projections 15 both have the axially end bases open. Inside the internal radially end base of each tubular projection 15 it is possible to provide a bevelled annular shoulder (not illustrated) acting as a buffer for the bevel of the base of the matrix for covering the cylindrical module 3 in such a way that the radially internal base of the cylindrical element 3 is aligned with the radially internal base of the tubular projection 15.

The edge of the semi-spherical cap 13 has three sections which extend beyond the maximum meridian line 21 of the semi-spherical cap 13 defining clips 17, alternating with three sections of a complementary shape which extend within the maximum meridian line 21 defining recesses 19 for housing the clips 17.

As can now be seen in particular from FIG. 3, the grid structure defines cubic cells whose sides are occupied by the cylindrical modules 3 and whose tops or nodes are instead occupied by the spherical modules 1.

The joining element 11 is attached to the spherical module 1 before inserting the cylindrical modules 3 in the corresponding projection 15 on the side of the radially external end base of the projection 15.

The housing 14 of the joining element 11 encapsulates a half-part of the spherical module 1 and each joining element 11 thus remains attached to the spherical module 11 thanks to the hold on the spherical module 1 by the clips 17. Subsequently the cylindrical modules 3 to be contacted to the spherical module 3 encapsulated by the housing 14 of the joining element 11 can be inserted in the projections 15 of the joining element 11.

In the case wherein the spherical module 1 is arranged in a peripheral node of the grid structure wherein three cylindrical modules 3 have to converge, it is sufficient to attach to the spherical module 1 one single joining element 11, while in the case wherein the spherical module 1 is arranged in an internal node of the grid structure wherein six cylindrical modules 3 have to converge, it is necessary to attach to the spherical module 1 two joining elements 11 which slot, making the complementary sections 17 and 19 of the two joining elements 11 match in such a way that the projections 15 of the two joining elements 11 are coaxial in pairs.

The joining elements 11 can be attached in all or, according to the cases, only in some appropriate nodal points of the grid structure, for example in the nodal points of zones of the grid structure most stressed.

What is described above must also be deemed as extending to cases wherein the modules of the grid structure are different from the cylindrical and spherical modules shown hitherto.

The grid structure can for example be formed by parallelepiped elongated modules and by cubic modules arranged at the nodes of the grid structure. In this case the joining element will have a framework formed with orthogonal plane faces matching corresponding faces of a cubic module of the grid structure, and tubular projections which extend from at least two faces of the framework.

The projections 15 of the joining element 11 can finally be non-aligned one in relation to the other with an acute or obtuse angle.

It must be noted above all that the joining element 11 does not generate undesirable dispersions of magnetic flow from the magnetic circuit which is formed via the modules of the grid structure connected thereby.

Figure 4:
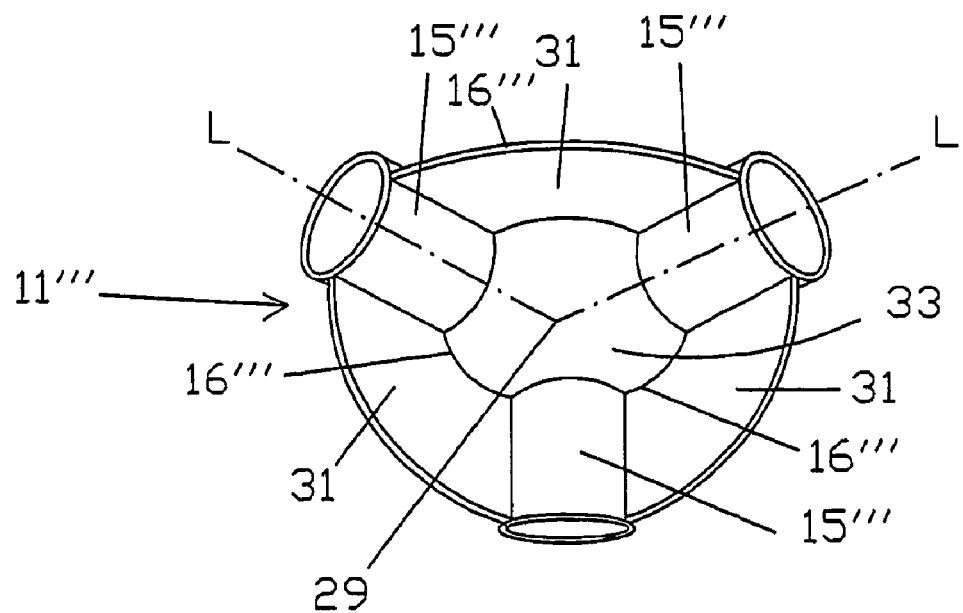
FIG. 4 shows a perspective view of another embodiment of a joining element in accordance with the present invention.
Figure 5:
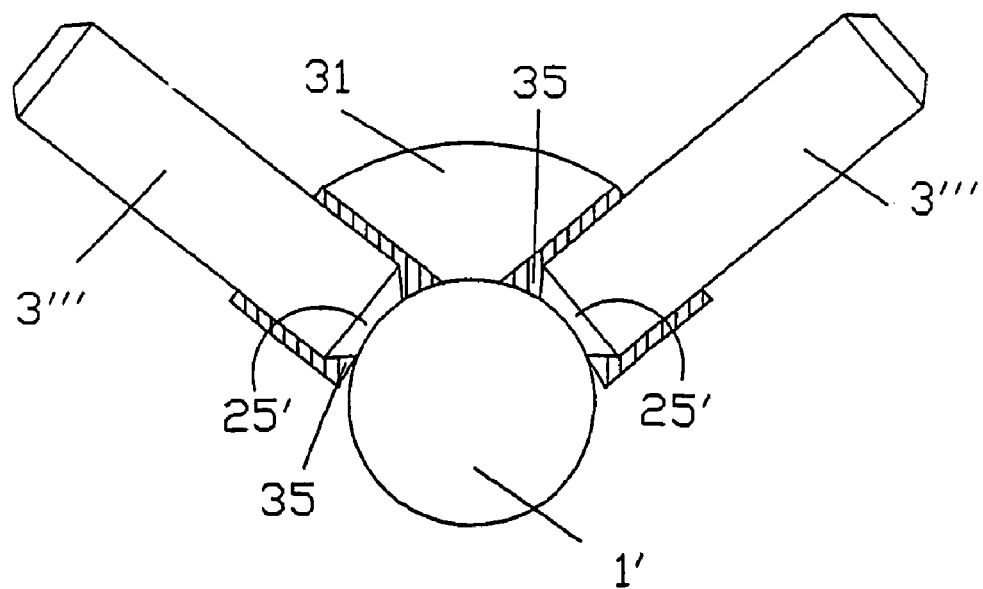
FIG. 5 is a plan view from above of a portion of grid structure which uses the joining element of FIG. 4 sectioned by the plane containing the broken line L-L.

FIGS. 4 and 5 show a further preferred embodiment of the present invention wherein the element 11''' for joining cylindrical modules 3''' of the type in FIG. 2 comprises three tubular projections 15''', orthogonal one in relation to the other and arranged radially and at a predetermined radial distance from a common centre of symmetry 29.

The joining element 11''' has a body wherefrom the projections 15''' extend. Such a body of the joining element is defined by three flattened ribbings 31 which develop between the opposite axial generatrices of the side wall of each pair of adjacent projections 15''' of the joining element 11'''.

In this embodiment too the projections 15''' have both axial ends open.

The internal edges 16''' of the flattened ribbings 31 define a surface of an open spherical housing 33 of the body of the joining element 11''' for securing a spherical module 1' into said open housing 33.

The peripheral spherical surface of the housing 33 has radius equal to the radius of the spherical module 1', the latter being preferably of ferromagnetic type.

The radially internal end bases of the projections 15''' open onto the housing 33 in such a way as to be able to directly match with the spherical surface of the spherical ferromagnetic module 1'.

Inside the radially internal end of the three tubular projections 15''' a bevelled annular shoulder 35 is formed wherein the bevel 25' of the three cylindrical modules 3''' fits, so that each cylindrical module 3''' can be placed in line with the radially internal base of the respective projection 15''' and can touch directly a spherical module 1', while the joining element 11''' remains blocked between the cylindrical modules 3''' and the spherical module 1'.

The annular shoulder 35 which acts as an end-of-stroke for the corresponding cylindrical module 3''' plays an important role when a ribbing 31 of the support framework of the joining element 11''' is used in a horizontal position for supporting the corner of a panel or of a shelf to be fixed to the grid structure. In this case the weight of the shelf or of the panel can be discharged and distributed on the vertical cylindrical modules 3''' opposite the ribbings 31 whereon the shelf or panel rests.

Naturally more than one joining element 11''' of the cylindrical modules 3''' can be attached to the spherical surface of the same module 1' and a joining element 11''' can be attached in any portion of the spherical module 1'.

Advantageously moreover a cylindrical module 3''' can be connected directly to the spherical module 1' through the open housing 33.

Figure 6:
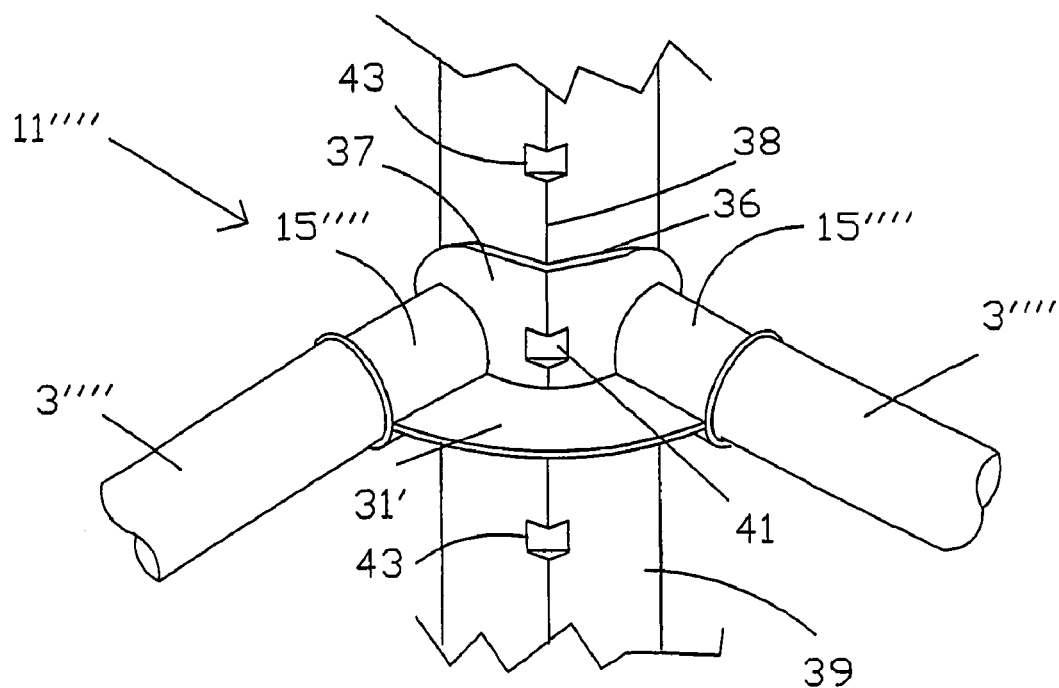
FIG. 6 shows a front perspective view of another embodiment of the joining element of the present invention.

FIG. 6 shows a further preferred embodiment of the present invention wherein the element 11'''' for joining cylindrical modules 3'''' of the type in FIG. 2 comprises two tubular attachments 15'''' having the end bases open. The attachments 15"" are orthogonal one in relation to the other and have attachment axes which extend radially from a common centre.

The joining element 11"" comprises a body wherefrom the attachments 15"" extend. The body of the joining element is formed by a plate 37 bent at a right angle. The attachments 15"" extend from the side of the convex surface of the plate 37 and have the radially internal open end base on the plate 37, while the concave surface 36 forms a housing for securing a parallelepiped module 39.

The attachments 15"" are also connected by a flat ribbing 31' which extends between the opposite axial generatrices of the side walls of the two attachments 15"".

Inside the radially internal end base of the attachments 15"" a bevelled annular shoulder can be provided (not shown), acting as an end-of-stroke for the cylindrical element 3"" inserted in the attachment 15"" on the side of the radially external end base of the attachment 15"".

Along the edge of the concave surface 36 of the plate 37 a fixed or removable tooth 41 is formed which can fit into any one of the notches 43 formed at regular intervals on the edge 38 of the ferromagnetic parallelepiped module 39.

The concave surface 36 of the plate 37 matches that of the parallelepiped module 39 and thus allows the two cylindrical modules 3"" to be maintained in direct contact with the parallelepiped module 39.

The joining element 11"" in this case blocks the relative angular arrangement between the two cylindrical modules 3"" and simultaneously the position of the cylindrical modules 3"" on the longitudinal axis of the ferromagnetic module 39, and can therefore in this case too be used for the support of shelves and/or panels.

Naturally it is possible to adopt a cylindrical module instead of module 39 and a corresponding cylindrical coupling part of the body of the joining element instead of plate 37 without departing from the scope of the invention: generally speaking the body of the joining element according to the present invention has to provide a housing for a further module, said housing comprising a surface shaped as the peripheral surface of said further module for engaging said further module.

Figure 7:
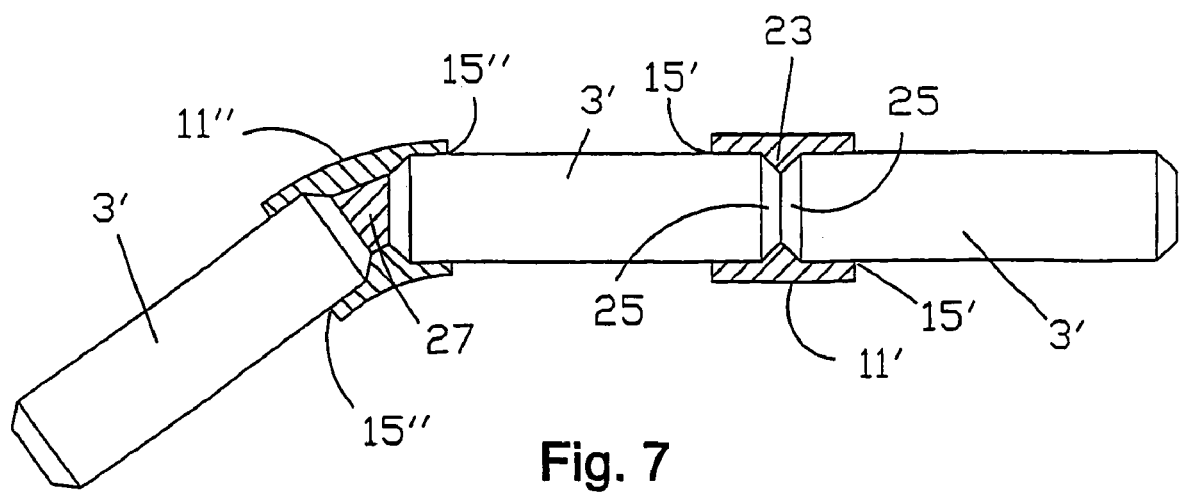
FIG. 7 is a view of a portion of grid structure which uses other joining elements (shown partially sectioned) in accordance with the present invention.

FIG. 7 shows further preferred embodiments of the joining element of the present invention which can be used for head-joining two cylindrical modules 3' of the type in FIG. 2.

In this case each joining element has a body wherefrom a pair of tubular attachments 15', 15' or 15", 15" directly connected one to the other extend.

In FIG. 7 the body of one joining element 11' has coaxial attachments 15', 15' while the other joining element 11" has non-aligned attachments 15", 15".

By varying the angle of non-alignment and the axial distance of the subsequent cylindrical modules 3' of the grid structure it is possible to create three-dimensional figures of any shape and complexity, for example "S" or "U" shapes.

As can be seen again from FIG. 7, the joining element 11', in the point of connection between the attachments 15' 15', defines a bevelled internal annular shoulder 23 wherein the bevel 25 of the cylindrical modules 3', slotted in the attachments 15', 15', fits. The bevelled annular shoulder 23 of the joining element 11' therefore serves as an end-of-stroke for the two cylindrical modules 3' which, having achieved the position of end of stroke, are joined at the head and in direct contact one with the other.

Again in FIG. 7, into the curved tubular coupling portion of the body of the joining element 11" for coupling the tubular projections 15", 15", an axial spacer 27 with a trapezoidal shape is integrated and which allows two cylindrical modules 3' to be head-joined and at the same time the axial distance between them to be adjusted to a predefined value.

The axial spacer 27 can be a piece of ferromagnetic material which does not introduce dispersion of magnetic flow at the join or in turn can be a magnetic module oriented in such a way as to combine in series its magnetic potential difference with those installed in the magnetic circuit generated by the grid structure.

Naturally a spacer can be provided even in a right tubular coupling portion between coaxial attachments of the body of the joining element.

FIG. 7 therefore discloses an element for the head-joining of two elongated modules to be placed in direct contact one with the other or to be connected with the interposing of an axial spacer directly integrated in the joining element.

In any case it is possible to extend the teaching of FIG. 7 also to the case of joining elements with more than two attachments for the attachment of elongated modules. The joining element can be formed by three tubular attachments arranged as a "T" or respectively by several attachments arranged in a star.

Inside the body of the joining element, in the central tubular coupling portion between the attachments, a ferromagnetic insert or a magnetic module in contact with the elongated modules inserted in the attachments can be integrated so as to avoid dispersions of the magnetic flow which is formed via the modules connected by the joining element.

The angular orientation of the attachments of the body of a joining element in accordance with the present invention can be different from that shown, for example the attachments can form an acute or obtuse angle one in relation to the other.

In the case wherein an elongated module to be connected via the joining element of the present invention is subjected to a stress of pure traction, it is possible to provide means for blocking its axial sliding in relation to the attachment wherein it is inserted, formed for example by a transverse pin inserted through special holes provided in the attachment and in the elongated module inserted in the attachment. Therefore, even when the sole force of magnetic anchorage acting on the elongated module subjected to traction is less than the tractive force acting thereon, the detachment of the elongated module from the assembly is now contrasted not only by the magnetic anchorage force of the elongated module subjected to traction but also by the magnetic anchorage force, evaluated in the direction of traction of the elongated module subjected to traction, exerted by part of the other elongated modules of the assembly connected via the joining element which involves the elongated module subjected to traction.

The joining elements 11, 11', 11", 11''', 11"" can stiffen the grid structure without altering its appearance and for this reason are preferably made in a transparent and rigid plastic material. The cylindrical modules 3, 3', 3''', 3"" are oriented in such a way that the differences of magnetic potential generated by them in the magnetic circuit formed via the grid structure are combined in series. The system of stiffening of the present invention enables the procedure for assembly of modules described in the Italian patent no. 01301090, whereof the same Applicant is owner, to be applied.

In particular the modules which form the grid structure can thus be modules of a first type, consisting of at least one active magnetic element, that is to say an element which has two surfaces of opposite polarity, at least one ferromagnetic element and possibly a non-magnetic covering matrix, or modules of the first type combined with modules of a second type, the latter consisting of a ferromagnetic element if necessary inserted in a non-magnetic covering matrix.

The assembly of the modules is carried out in such a way that the magnetic flow generated by the active magnetic elements involved in the anchorage closes totally or at least partially via the ferromagnetic parts of the grid structure, and in such a way that the differences of magnetic potential produced in the magnetic circuit generated by the active magnetic elements which form the anchorage are combined in series.

The invention claimed is:

1. A magnetic assembly, comprising:
   at least one joining element, each having at least two hollow sections, each said hollow section defining an open passage therethrough;
   at least one elongated magnetic module having an exterior that conforms to said hollow section; and
   at least one ferromagnetic module having an exterior that conforms to an engaging surface of the joining element, the open passage of the hollow section opening onto the engaging surface;
   wherein the elongated magnetic module, the joining element, and the ferromagnetic module are constructed so that the joining element and the ferromagnetic module are placed onto conforming contact, and each of a plurality of said elongated magnetic modules is inserted into a respective said hollow section, each of the elongated magnetic modules being held in magnetic contact with the ferromagnetic module, the hollow sections holding the elongated magnetic modules in a fixed relationship with one another.

2. The magnetic assembly of claim 1, wherein an interior of each said hollow section conforms to the exterior of the elongated magnetic module over an entirety of an axial length of the hollow section.

3. The magnetic assembly of claim 1, wherein a shoulder is disposed on an interior of each said hollow section near an end of the hollow section that opens onto a portion of the joining element to which the ferromagnetic module conforms.

4. The magnetic assembly of claim 3, wherein the joining element is trapped between the ferromagnetic module and the elongated magnetic modules.

5. The magnetic assembly of claim 1, wherein the at least two hollow sections are orthogonally arranged with respect to one another.

6. The magnetic assembly of claim 1, wherein the joining element comprises three said hollow sections, all of which are orthogonally arranged with respect to one another.

7. The magnetic assembly of claim 1, wherein the joining element comprises transparent and rigid plastic material.

8. The magnetic assembly of claim 1, wherein each of the at least two hollow sections is a tubular portion.

9. The magnetic assembly of claim 1, wherein the engaging surface of the joining element is generally hemispherical.

10. The magnetic assembly of claim 9, wherein the hemispherical engaging surface comprises edge sections that project beyond a maximum meridian line of the engaging surface, the projecting edge sections arranged to alternate with edge sections of a complementary shape that extend within the maximum meridian line of the complementary surface, so that two said joining elements can clamp to a spherical said ferromagnetic module.

11. The magnetic assembly of claim 9, wherein the joining element comprises three said hollow sections, all of which are orthogonally arranged with respect to one another.

12. The magnetic assembly of claim 9, wherein the joining element comprises a flat ribbing extending between adjacent side walls of the at least two hollow sections.

13. The magnetic assembly of claim 1, wherein the engaging surface of the joining element has an L-shaped cross section.

14. The magnetic assembly of claim 13, wherein the engaging surface of the joining element comprises an engaging tooth, the ferromagnetic module comprising a plurality of notches, each of the notches being shaped to allow engagement with the tooth.

15. The magnetic assembly of claim 14, wherein the ferromagnetic module has an elongated body, and wherein the notches are aligned and spaced apart along said elongated body.

16. The magnetic assembly of claim 13, wherein the joining element comprises a flat ribbing extending between adjacent side walls of the at least two hollow sections.

17. The magnetic assembly of claim 1, wherein the engaging surface of the joining element is cylindrical.

18. The magnetic assembly of claim 17, wherein the engaging surface of the joining element comprises an engaging tooth, the ferromagnetic module comprising a plurality of notches, each of the notches being shaped to allow engagement with the tooth.

19. The magnetic assembly of claim 18, wherein the ferromagnetic module has an elongated body, and wherein the notches are aligned and spaced apart along said elongated body.

20. The magnetic assembly of claim 1, further comprising means for locking the elongated modules into the hollow sections.

21. The magnetic assembly of claim 20, wherein the means for locking comprises a transverse pin.

22. A magnetic assembly comprising:
   at least one sleeve-shaped joining element, each having at least two tubular portions, each said tubular portion defining an open passage therethrough;
   at least one elongated magnetic module having an exterior that conforms to an interior of said tubular portion; and
   at least one spacer disposed within the sleeve-shaped joining element, the spacer being one of magnetic and ferromagnetic;
   wherein the elongated magnetic module, the joining element, and the spacer are constructed so that each of a plurality of said elongated magnetic modules is inserted into a respective said tubular portion, each of the elongated magnetic modules being held in magnetic contact with the spacer, the tubular portions holding the elongated magnetic modules in a fixed relationship with one another in which the longitudinal axes of the elongated modules are not aligned with one another.

23. The magnetic assembly of claim 22, wherein the spacer is ferromagnetic.

24. The magnetic assembly of claim 22, wherein the spacer is magnetic.

25. The magnetic assembly of claim 22, wherein the sleeve-shaped joining element further comprises a shoulder arranged at each axial end of the spacer, such that inserting said elongated magnetic module into one of the tubular portions until making contact with said shoulder places an end of the inserted elongated magnetic module in contact with the spacer.

26. The magnetic assembly of claim 22, wherein the spacer is provided into an intermediate tubular portion between the at least two tubular portions.

27. The magnetic assembly of claim 22, wherein the joining element comprises transparent and rigid plastic material.

28. The magnetic assembly of claim 22, further comprising means for locking the elongated modules into the tubular portions.

29. The magnetic assembly of claim 28, wherein the means for locking comprises a transverse pin.

30. A magnetic assembly, comprising:
   at least one first joining element, each having at least two tubular portions, each said tubular portion defining an open passage therethrough;
   at least one ferromagnetic module having an exterior that conforms to an engaging surface of the first joining element, the open passage of the tubular portion opening onto the engaging surface;
   at least one sleeve-shaped second joining element, each having at least two said tubular portions, each said tubular portion defining an open passage therethrough;
   at least one elongated magnetic module having an exterior that conforms to an interior of said tubular portion; and
   at least one spacer disposed within the sleeve-shaped joining element;
   wherein the elongated magnetic module, the first joining element, and the ferromagnetic module are constructed so that the first joining element and the ferromagnetic module are placed onto conforming contact, each of a plurality of said elongated magnetic modules being inserted into a respective said tubular portion of the first joining element, each of the elongated magnetic modules being held in magnetic contact with the ferromagnetic module, the tubular portions of the first joining element holding the elongated magnetic modules in a fixed relationship with one another; and
   wherein the elongated magnetic module, the second joining element, and the spacer are constructed so that the each of a plurality of said elongated magnetic modules is inserted into a respective said tubular portion of the second joining element, each of the elongated magnetic modules being held in magnetic contact with the spacer, the tubular portions of the second joining element holding the elongated magnetic modules in a fixed relationship with one another.

31. The magnetic assembly of claim 30, wherein for each of the first joining elements an interior of each said tubular portion conforms to the exterior of the elongated magnetic module over an entirety of an axial length of the tubular portion.

32. The magnetic assembly of claim 30, wherein the at least two tubular portions are orthogonally arranged with respect to one another.

33. The magnetic assembly of claim 30, wherein the first joining element comprises three said tubular portions, all of which are orthogonally arranged with respect to one another.

34. The magnetic assembly of claim 30, wherein the first and second joining elements comprise transparent and rigid plastic material.

35. The magnetic assembly of claim 30, wherein the spacer in the second joining element is ferromagnetic.

36. The magnetic assembly of claim 30, wherein the spacer in the second joining element is magnetic.

37. The magnetic assembly of claim 30, wherein the tubular portions in the second joining element are coaxial with one another.

38. The magnetic assembly of claim 30, wherein the tubular portions in the second joining element are not coaxial with one another.

39. The magnetic assembly of claim 30, wherein the spacer in the second joining element is provided into an intermediate tubular portion between the at least two tubular portions.

40. The magnetic assembly of claim 30, wherein for each of the first joining elements a shoulder is disposed on an interior of each said tubular portion near an end of the tubular portion that opens onto a portion of the first joining element to which the ferromagnetic module conforms.

41. The magnetic assembly of claim 40, wherein the first joining element is trapped between the ferromagnetic module and the elongated magnetic modules.

42. The magnetic assembly of claim 30, wherein the engaging surface of the first joining element is generally hemispherical.

43. The magnetic assembly of claim 42, wherein the hemispherical engaging surface comprises edge sections that project beyond a maximum meridian line of the engaging surface, the projecting edge sections arranged to alternate with edge sections of a complementary shape that extend within the maximum meridian line of the complementary surface, so that two said first joining elements can clamp to a spherical said ferromagnetic module.

44. The magnetic assembly of claim 42, wherein the first joining element comprises three said tubular portions, all of which are orthogonally arranged with respect to one another.

45. The magnetic assembly of claim 42, wherein the first joining element comprises a flat ribbing extending between adjacent side walls of the at least two tubular portions.

46. The magnetic assembly of claim 30, wherein the engaging surface of the first joining element has an L-shaped cross section.

47. The magnetic assembly of claim 46, wherein the engaging surface of the first joining element comprises an engaging tooth, the ferromagnetic module comprising a plurality of notches, each of the notches being shaped to allow engagement with the tooth.

48. The magnetic assembly of claim 47, wherein the ferromagnetic module has an elongated body, and wherein the notches are aligned and spaced apart along said elongated body.

49. The magnetic assembly of claim 46, wherein the first joining element comprises a flat ribbing extending between adjacent side walls of the at least two tubular portions.

50. The magnetic assembly of claim 30, wherein the engaging surface of the first joining element is cylindrical.

51. The magnetic assembly of claim 50, wherein the engaging surface of the first joining element comprises an engaging tooth, the ferromagnetic module comprising a plurality of notches, each of the notches being shaped to allow engagement with the tooth.

52. The magnetic assembly of claim 51, wherein the ferromagnetic module has an elongated body, and wherein the notches are aligned and spaced apart along said elongated body.

53. The magnetic assembly of claim 30, further comprising means for locking the elongated modules into the tubular portions of the first and second joining elements.

54. The magnetic assembly of claim 53, wherein the means for locking comprises a transverse pin.

55. A magnetic assembly comprising:
   at least one elongated module having a first exterior surface;

at least one ferromagnetic shaped module having a second exterior surface, said elongated module and said shaped module being magnetically anchorable to each other; and at least one joining element comprising:

an engaging surface conforming to the second external surface of the shaped module; and at least two hollow sections, each of said hollow sections defining an open passage therethrough having an interior surface conforming to the first exterior surface of the elongated module;

wherein the elongated module, the shaped module and the joining element are constructed so that the engaging surface of the joining element and the second exterior surface of the shaped module are placed into conforming contact, each of a plurality of said elongated modules being held in magnetic contact with the shaped module, the hollow sections of the joining element holding the elongated modules in a fixed relationship with one another.

56. The magnetic assembly of claim 55, wherein an interior of each said hollow section conforms to the first exterior surface of the elongated module over an entirety of an axial length of the hollow section.

57. The magnetic assembly of claim 55, wherein the at least two hollow sections are orthogonally arranged with respect to one another.

58. The magnetic assembly of claim 55, wherein the joining element comprises three said hollow sections, all of which are orthogonally arranged with respect to one another.

59. The magnetic assembly of claim 55, wherein the joining element comprises transparent and rigid plastic material.

60. The magnetic assembly of claim 55, wherein each of the at least two hollow sections is a tubular portion.

61. The magnetic assembly of claim 55, wherein a shoulder is disposed on an interior of each said hollow section near an end of the hollow section that opens onto a portion of the joining element to which the shaped module conforms.

62. The magnetic assembly of claim 61, wherein the joining element is trapped between the shaped module and the elongated modules.

63. The magnetic assembly of claim 55, wherein the engaging surface of the joining element is generally hemispherical.

64. The magnetic assembly of claim 63, wherein the hemispherical engaging surface comprises edge sections that project beyond a maximum meridian line of the engaging surface, the projecting edge sections arranged to alternate with edge sections of a complementary shape that extend within the maximum meridian line of the complementary surface, so that two said joining elements can clamp to a spherical said shaped module.

65. The magnetic assembly of claim 63, wherein the joining element comprises three said hollow sections, all of which are orthogonally arranged with respect to one another.

66. The magnetic assembly of claim 63, wherein the joining element comprises a flat ribbing extending between adjacent side walls of the at least two hollow sections.

67. The magnetic assembly of claim 55, wherein the engaging surface of the joining element has an L-shaped cross section.

68. The magnetic assembly of claim 67, wherein the engaging surface of the joining element comprises an engaging tooth, the shaped module comprising a plurality of notches, each of the notches being shaped to allow engagement with the tooth.

69. The magnetic assembly of claim 68, wherein the shaped module has an elongated body, and wherein the notches are aligned and spaced apart along said elongated body.

70. The magnetic assembly of claim 67, wherein the joining element comprises a flat ribbing extending between adjacent side walls of the at least two hollow sections.

71. The magnetic assembly of claim 55, wherein the engaging surface of the joining element is cylindrical.

72. The magnetic assembly of claim 71, wherein the engaging surface of the joining element comprises an engaging tooth, the shaped module comprising a plurality of notches, each of the notches being shaped to allow engagement with the tooth.

73. The magnetic assembly of claim 72, wherein the shaped module has an elongated body, and wherein the notches are aligned and spaced apart along said elongated body.

74. The magnetic assembly of claim 55, further comprising means for locking the elongated modules into the hollow sections.

75. The magnetic assembly of claim 74, wherein the means for locking comprises a transverse pin.

* * * * *